June 27, 1967 J. R. DREW 3,328,046
SHRUB CART OR THE LIKE
Filed Sept. 1, 1966
2 Sheets-Sheet 1
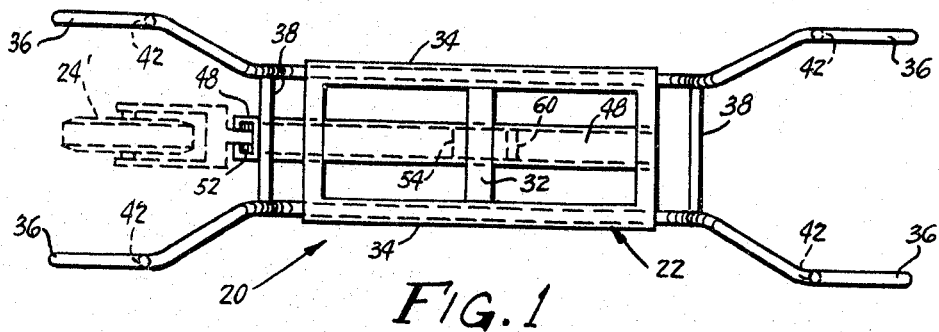
FIG. 1
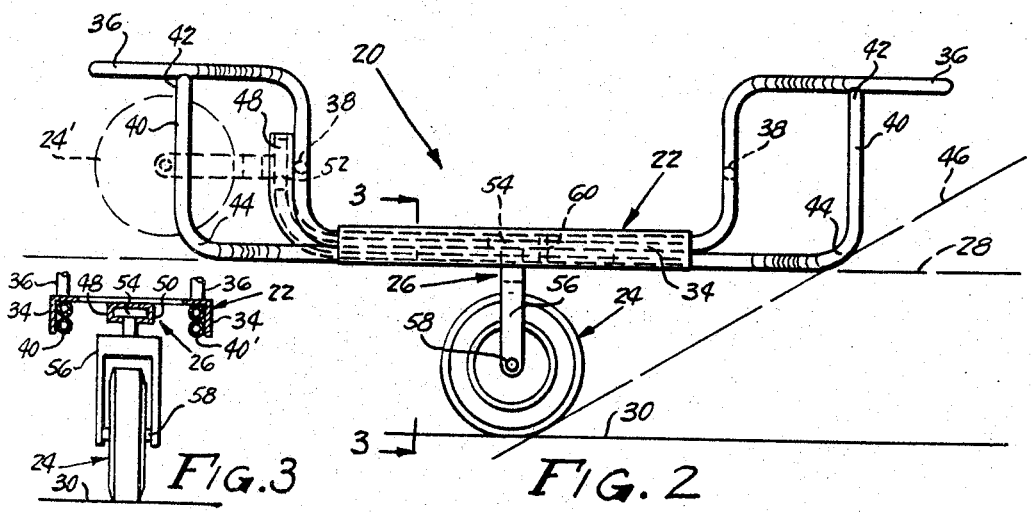
FIG. 3   FIG. 2
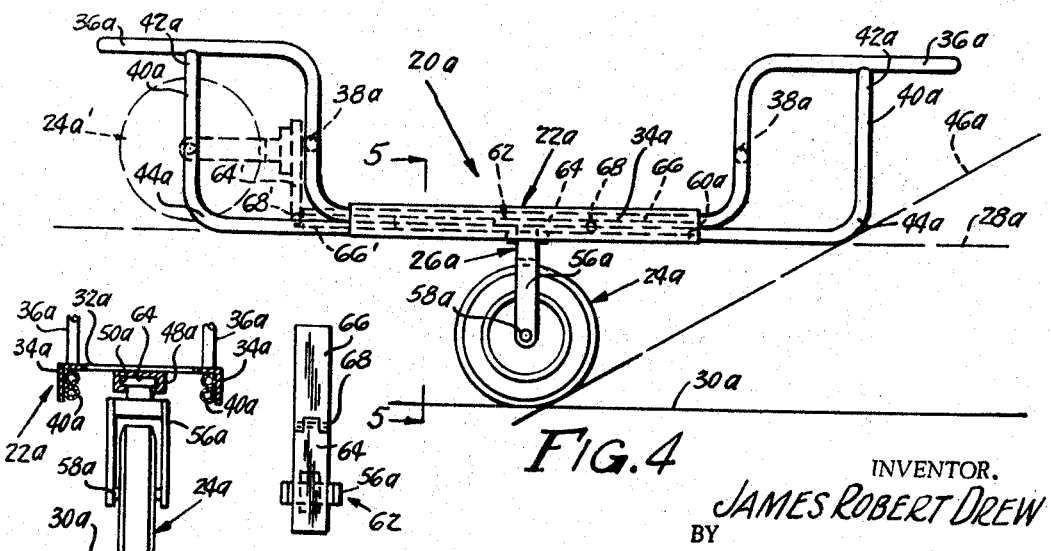
FIG. 5   FIG. 6   FIG. 4
INVENTOR.
JAMES ROBERT DREW
BY
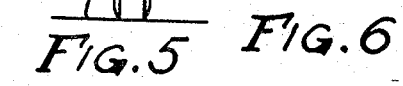
ATTORNEYS.

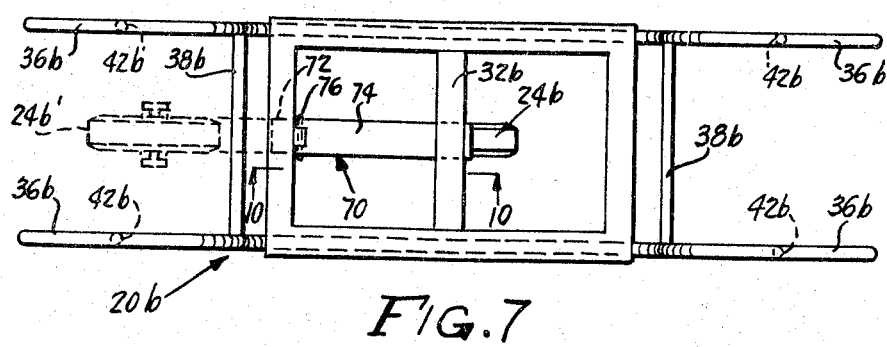
FIG. 7
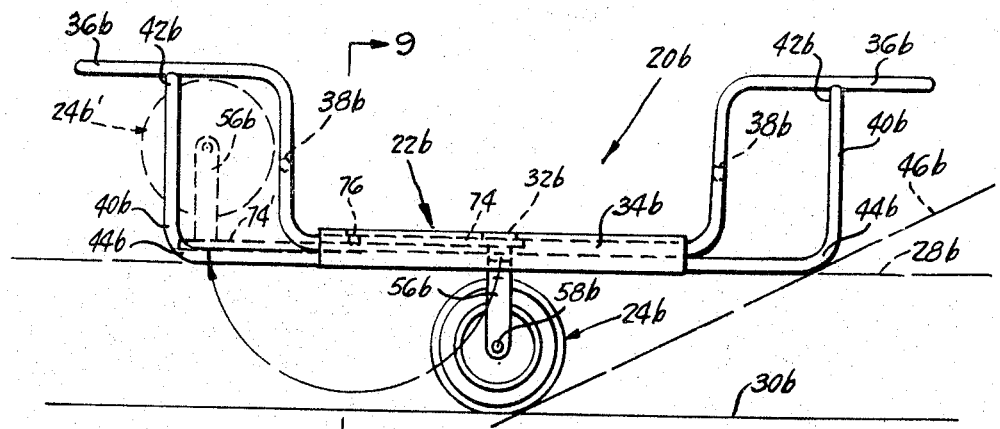
FIG. 8
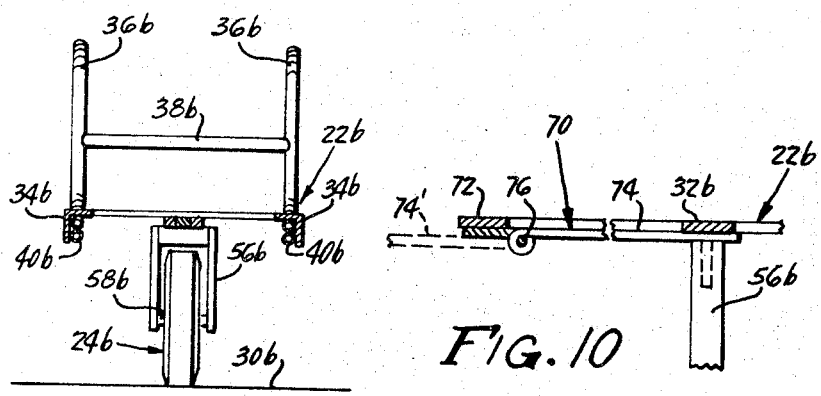
FIG. 9
FIG. 10
INVENTOR.
JAMES ROBERT DREW
BY
Kimmel, Crowell & Weaver
ATTORNEYS.

United States Patent Office 3,328,046
Patented June 27, 1967

3,328,046
SHRUB CART OR THE LIKE
James Robert Drew, 2691 Jackson St.,
Eugene, Oreg. 97405
Substituted for abandoned application Ser. No. 386,691,
July 31, 1964. This application Sept. 1, 1966, Ser. No.
576,569
7 Claims. (Cl. 280—43.1)

This invention relates to a shrub cart or the like and more particularly to a cart for transporting articles such as shrubbery from one place to another.

A primary object of this invention is the provision of a device of the type described which is sturdy and durable in construction, reliable and efficient in operation, and relatively simple and inexpensive to manufacture, utilize, and maintain.

Another object of this invention is the provision of a shrub cart which is easy to load since the shrub receiving platform rests directly on the ground or other supporting surface when the cart is stationary, and easy to move since novel means are included to raise the platform onto a reliable support when it is to be transported.

A further object of the instant invention is the provision of a cart for transporting shrubbery or the like including a wheel means maintained out of contact with a supporting surface in a stationary position of the cart and dropped by gravity into a reliably supporting relationship with respect to the platform on tilting the platform preparatory to transporting the cart.

Still another object of the instant invention is to provide a device of the type described which may be handled from either end, by one or two users, to facilitate transporting heavy loads in any direction.

Other and further objects reside in the combination of elements, arrangement of parts and features of construction.

Still other objects will in part be obvious and in part be pointed out as the description of the invention proceeds and as shown in the accompanying drawings wherein:

FIGURE 1 is a top plan view of one embodiment of the shrub cart of the instant invention, the stationary position of the wheel means being shown in dotted lines;

FIGURE 2 is a side elevational view thereof with the relationship between the supporting surface and the cart in the lifting position and in the stationary position being shown in dashed lines;

FIGURE 3 is a fragmentary transverse cross-sectional view taken substantially on line 3—3 of FIGURE 2;

FIGURE 4 is a side elevational view similar to FIGURE 2 of a modified embodiment of the device of the instant invention;

FIGURE 5 is a fragmentary transverse cross-sectional view taken substantially on line 5—5 of FIGURE 4;

FIGURE 6 is a top plan view of an elongated plate forming part of the collapsible support means of the embodiment of FIGURE 4;

FIGURE 7 is a top plan view similar to FIGURE 1 of a still further embodiment of the shrubbery cart of the instant invention;

FIGURE 8 is a side elevational view similar to FIGURE 2 of the embodiment of FIGURE 7;

FIGURE 9 is a transverse cross-sectional view taken substantially on line 9—9 of FIGURE 8; and FIGURE 10 is a fragmentary cross-sectional view taken substantially on line 10—10 of FIGURE 7.

Like reference characters refer to like parts throughout the several views of the drawings.

Referring now to the drawings in general, and more particularly to FIGURES 1 to 3, one embodiment of the device of the instant invention is designated generally by the reference numeral 20 and comprises basically a platform 22 for receiving the shrubbery (not shown) thereon, wheel means 24, collapsible support means 26 rotatably carrying the wheel means 24 and operatively connecting the same to the platform 22 for movement between a stationary position shown in dotted lines wherein the wheel means 24 extends to one side of, and in vertically spaced relationship to the horizontal plane of, the platform 22 with the platform 22 resting directly on a supporting surface as shown in dashed lines at 28, and a transporting position shown in full lines wherein the wheel means 24 underlies and supports the platform 22, the wheel means 24 resting directly on the supporting surface as shown at 30 in FIGURE 2.

The platform 22 is a substantially rectangular peripheral frame having a central cross bar 32 for strength and downwardly depending side flanges 34. Handle means in the form of bifurcated tubular handle members 36 extend from opposite sides of the platform 22 beneath the same and within the surface of the side flanges 34, secured thereto in any conventional manner, with cross bars 38 connecting the handle members for structural reinforcement.

Oppositely disposed fulcrum members 40 underlie, and are secured to the handle members 36 beneath the platform 22 and at their terminal ends 42, each fulcrum member 40 defining a fulcrum 33 spaced horizontally from the platform 22 in substantially the same horizontal plane whereby the platform 22 may be tilted upwardly when the fulcrum 44 is engaged with the supporting surface as shown at 46 and the handle members 36 are pressed downwardly.

The collapsible support means in this embodiment includes an elongated track 48 secured to the underside of the platform 22 and defining a horizontal guideway 50 underlying the platform. The track 48 curves upwardly along one side of the platform 22 to define a vertical guideway 52. A follower 54 in the form of a T-shaped member is slidably engaged in the track 48 and is fixed to a bifurcated yoke 56 carrying an axle 58 rotatably supporting the wheel means 24. A stop member 60 is carried by the horizontal guideway 50 and engages the follower 54 to limit the movement of the wheel means 24 therein.

The use and operation of the embodiment of FIGURES 1 to 3 will now be apparent. When the cart is to be loaded with shrubbery or the like the follower 54 is slid in the track 48 down the horizontal guideway 50 and up the vertical guideway 52 to the dotted stationary position shown in FIGURES 1 and 2 wherein the platform 22 rests directly on the supporting surface 28. After the cart has been fully loaded, or when it is desired to move the same, the handle members 36 remote from the side of the platform 22 on which the wheel means is located in a stationary position, are pressed downwardly tilting the platform 22 up about the fulcrum 44 on the supporting surface 46 whereby the wheel means 24 will carry the follower 48 down the vertical guideway 52 and the horizontal guideway 50 in the track 48 under the influence of gravity until it engages the stop member 60 to position the same substantially centrally under the platform 22. On raising the handle members 36 the wheel means 24 rollably supports the platform 22 on the supporting surface 30 to permit transportation of the cart 20 in either direction. Movement of the wheel means 24 to the stationary position 24' is effected by reversing the above procedure.

Reference is now made to FIGURES 4 to 6 showing another embodiment of this invention wherein similar parts are designated by the same reference numeral as in the embodiment of FIGURES 1 to 3, followed by the suffix "a." In this modification the collapsible support means 26a is comprised basically of an elongated track 48a secured to the underside of the platform 22a and defining a horizontal guideway 50a. An elongated plate 62 is slidably engaged in the track 48a and includes a first member 64 rotatably carrying the wheel means 24a and a second member 66 secured to the first member 64 by hinge means 68.

The use and operation of this embodiment is substantially similar to the embodiment of FIGURES 1 to 3. When the handle members 36a are pressed downwardly to tilt the platform 22a about the fulcrum 44a the wheel means 24a drops under the influence of gravity to extend the first member 64 at approximately 180° with respect to the second member 66 of the elongated plate 62, both members being slid in the horizontal guideway 50a until the second member 66 engages the stop 60a to locate the wheel means 24a substantially centrally underneath the platform means 22a. When it is desired to move the wheel means 24a to the stationary position 24a', the first member 64 of the elongated plate 62 is slid free of the guideway 50a at one side of the platform 22a and pivoted approximately 90° about the hinge means 68 with respect to the second member 66 to allow the platform 22a to directly contact the supporting surface 28a.

In the embodiment of FIGURES 7 to 10, parts similar to the embodiment of FIGURES 1 to 3 are designated by similar reference characters followed by the suffix "b." The collapsible support means 26b includes an elongated plate 70 having a first member 72 secured to the underside of the platform 22b and a second member 74 rotatably carrying the wheel means 24b at one end with hinge means 76 pivotally securing the other end of the second member 74 to the first member 72. The second member 74 is dimensioned to locate the wheel means 24b on one side of the platform 22b when the second member 74 is pivoted approximately 180° about the hinge means 76 as shown in dotted lines to the stationary position, the wheel means 24 being located substantially centrally underlying the platform 22b in the transporting position shown in full lines.

It will now be seen that there is herein provided an improved cart which is useful for transporting shrubs or other similar articles and which satisfies all of the objectives of the instant invention, and others, including many advantages of great practical utility and commercial importance.

Since many embodiments may be made of this inventive concept, and since many modifications may be made of the embodiments hereinbefore shown and described, it is to be understood that all matter herein is to be interpreted merely as illustrative, and not in a limiting sense.

I claim:

1. A cart for transporting shrubs or the like comprising a platform for receiving the shrubs thereon, wheel means, collapsible support means rotatably carrying said wheel means and operatively connecting the same to said platform for movement between a stationary position wherein said wheel means extends to one side of, and in vertically spaced relationship to the horizontal plane of, said platform, said platform resting directly on a supporting surface in said stationary position, and a transporting position wherein said wheel means underlies and supports said platform, said wheel means resting directly on the supporting surface in said transporting position, handle means extending from said platform to facilitate moving said cart with said wheel means in said transporting position, and a fulcrum member extending from said platform in an opposite direction to which said wheel means extends in said stationary position, said fulcrum member including portions defining a fulcrum spaced longitudinally from said platform in substantially the same horizontal plane as said platform, said handle means including a handle member extending in the same direction as said fulcrum member and spaced horizontally therefrom a greater distance than said fulcrum, said handle member being positioned in vertically spaced relationship to the horizontal plane of said platform, and said collapsible support means being gravity actuated to lower said wheel means from said stationary position to said transporting position when said platform is tilted about said fulcrum by downward pressure on said handle member.

2. The structure of claim 1 wherein said handle means includes handle members extending from opposite sides of said platform whereby said cart may be moved by two men and in opposite directions.

3. The structure of claim 1 wherein said collapsible support means includes an elongated track secured to the underside of said platform and defining a horizontal guideway underlying said platform, said track curving upwardly along said one side of said platform to define a vertical guideway, a follower slidably engaged in said track and rotatably carrying said wheel means, said follower being moved by gravity from said stationary position wherein it is received in said vertical guideway to said transporting position wherein it is received in said horizontal guideway on tilting of said platform about said fulcrum.

4. The structure of claim 3 further including a stop member carried by said horizontal guideway and engaging said follower in said transporting position to locate said wheel means substantially centrally of said platform.

5. The structure of claim 1 wherein said collapsible support means includes an elongated track secured to the underside of said platform and defining a horizontal guideway underlying said platform, an elongated plate slidably engaged in said track, said plate including a first member rotatably carrying said wheel means and a second member, hinge means pivotally connecting said first and second members, said first member being slid free of said guideway at said one side of said platform and pivoted approximately 90 degrees about said hinge means with respect to said second member in said stationary position while said second member is maintained in said guideway, and said first member extending at approximately 180 degrees with respect to said second member and being received in said guideway in said transporting position.

6. The structure of claim 5 further including a stop member carried by said guideway and engaging said second member in said transporting position to locate said wheel means substantially centrally of said platform.

7. The structure of claim 1 wherein said collapsible support means includes an elongated plate including a first member secured to the underside of said platform, a second member rotatably carrying said wheel means at one end, hinge means pivotally securing the other end of said second member to said first member, said second member being dimensioned to locate said wheel means on said one side of said platform when said second member is pivoted approximately 180 degrees about said hinge means to said stationary position and said wheel means being located substantially centrally underlying said platform in said transporting position.

References Cited

UNITED STATES PATENTS

| 2,124,956 | 7/1938 | Roener | 280—47.12 |
| 2,509,824 | 5/1950 | Johnson | 280—78 X |
| 2,979,338 | 4/1961 | Dwyer | 280—47.3 |

FOREIGN PATENTS

| 9,828 | 12/1908 | France. |
| 579,493 | 8/1946 | Great Britain. |
| 678,108 | 4/1952 | Great Britain. |

BENJAMIN HERSH, *Primary Examiner.*

C. C. PARSONS, *Assistant Examiner.*